United States Patent [19]

Harvey, Jr. et al.

[11] 4,096,893
[45] Jun. 27, 1978

[54] SYSTEM AND APPARATUS FOR THE RECONSTITUTION OF A FOOD OR BEVERAGE CONCENTRATE

[75] Inventors: John K. Harvey, Jr., Fairfield; Morris T. Watson, Danbury, both of Conn.; Constantine F. Economy, Allentown; Robert J. LeFevre, Bethlehem, both of Pa.

[73] Assignee: American Can Company, Greenwich, Conn.

[21] Appl. No.: 729,033

[22] Filed: Oct. 4, 1976

[51] Int. Cl.² ............................................. B65B 3/34
[52] U.S. Cl. ................................. 141/90; 99/302 R; 141/192; 141/329; 426/113
[58] Field of Search .................. 53/167; 99/282, 283, 99/295, 302 R, 357, 275, 300; 141/1, 9, 11, 19, 82, 85, 89-91, 98, 311 R, 329, 392, 198, 192; 222/83, 83.5, 86; 426/394, 402, 112; 134/198

[56] References Cited

U.S. PATENT DOCUMENTS

| | | | |
|---|---|---|---|
| 2,939,381 | 6/1960 | McBride | 141/329 X |
| 3,139,343 | 6/1964 | Baselt | 222/86 X |
| 3,615,673 | 10/1971 | Black et al. | 141/91 X |

Primary Examiner—Richard E. Aegerter
Assistant Examiner—Frederick R. Schmidt
Attorney, Agent, or Firm—Robert P. Auber; Ira S. Dorman; Harry W. Hargis, III

[57] ABSTRACT

A system for the reconstitution of a food and beverage concentrate comprising combined knife and nozzle means selectively movable between a retracted position and an extended position, in which latter position the combined knife and nozzle means pierces the removable lid of a container of concentrate and is operative automatically to inject a predetermined amount of heated water into the container to reconstitute the concentrate. Upon movement to retracted position means is automatically operative to rinse the combined knife and nozzle means.

19 Claims, 8 Drawing Figures

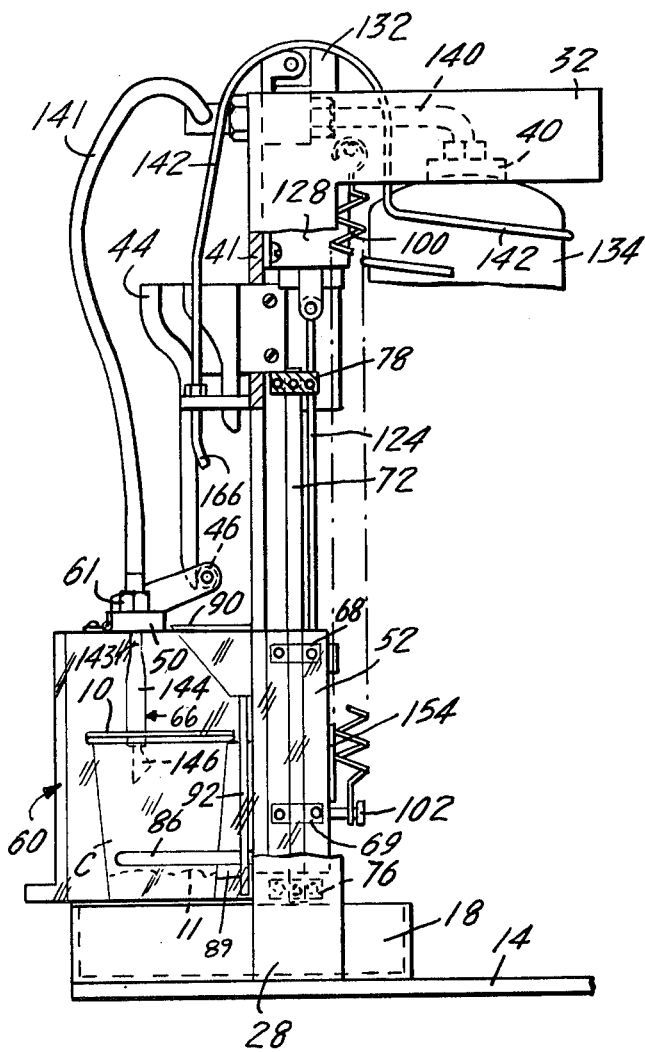
FIG. 5
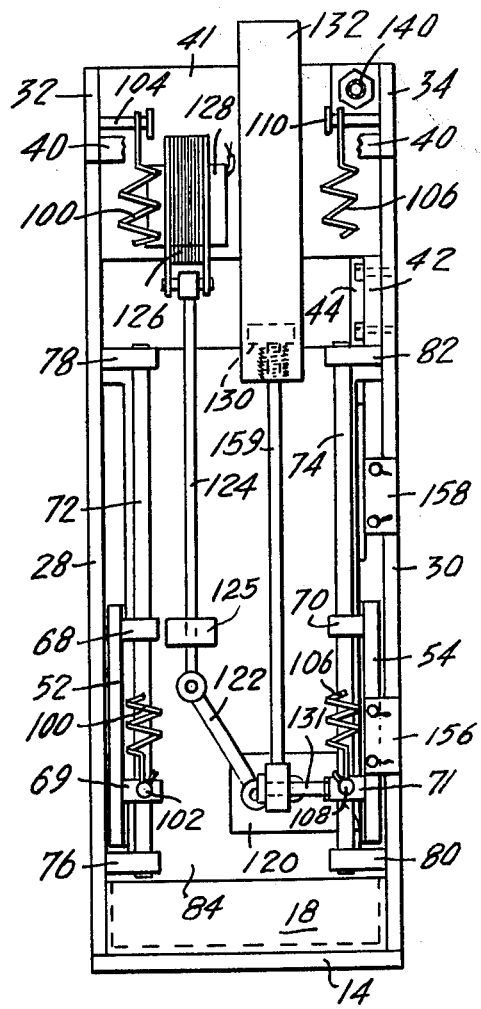
FIG. 4
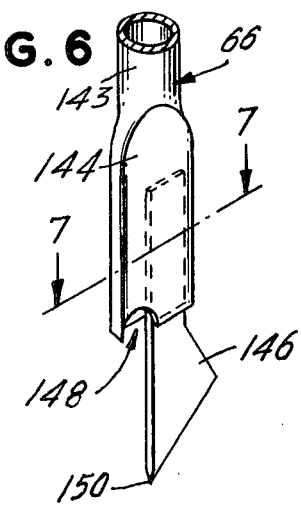
FIG. 6
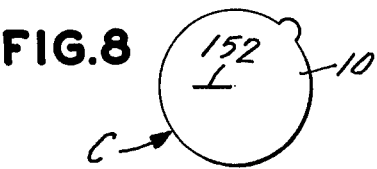
FIG. 7
FIG. 8

SYSTEM AND APPARATUS FOR THE RECONSTITUTION OF A FOOD OR BEVERAGE CONCENTRATE

BACKGROUND OF THE INVENTION

Apparatus for the dispensing of beverages and the like are well known in the art. In general these apparatuses, or machines, are in the form wherein, for example, an amount of beverage syrup is injected into an open cup and a metered amount of water added thereto to produce the consumable beverage. Machines for dispensing an already mixed beverage are also well known in the art such as shown in, for example, U.S. Pat. No. 2,810,407, wherein an open cup is telescoped into position with a beverage filling tube. U.S. Pat. No. 2,667,423 discloses a cup containing a frozen concentrate covered by a film of ice which forms a seal. Upon injection of a fluid into the cup, such as hot water, the ice seal melts and the concentrate mixes with the water to form a consumable beverage and the like. In this invention, however, the cup and concentrate must be kept in a frozen condition, while in the aforementioned U.S. Pat. No. 2,810,407 an already mixed beverage and the like is furnished from storage within the dispenser. In other machines both a syrup concentrate, for example, and water are furnished from storage within the machine. The instant invention, on the other hand, provides for reconstituting a food or beverage concentrate which need not be kept in a frozen condition and which is already supplied within a dispensing cup. This eliminates the need for separate sources of fluid and concentrate supply from within the machine, and the need for premixing of the fluid and concentrate prior to supplying of the machine.

OBJECTS OF THE INVENTION

It is accordingly a principal object of the present invention to provide a system, including a container having a food or beverage concentrate therein, for the preparation of a food or beverage.

It is another object of the present invention to provide an apparatus for reconstituting the prepackaged concentrate.

It is yet another object of the present invention to provide an injection nozzle for injecting a predetermined amount of fluid into the package having the concentrate therein to reconstitute the prepackaged concentrate.

It is still another object of the present invention to provide a system and apparatuses as aforesaid which are convenient and expeditious to use.

SUMMARY OF THE INVENTION

The instant invention relates to a system for dispensing of food and the like which includes a container having an open end and a food concentrate disposed therein, wherein the container has a pierceable and peelable cover adhered over the open end. Fluid injection means is provided which comprises nozzle means having tubular means for conveying a fluid and piercing means operable for substantially vertical movement with said tubular means from a first, retracted position to a second extended position to pierce the cover and inject a fluid into the container to mix with and reconstitute the food concentrate. The tubular means and the piercing means are further operable in the first position to tilt from the vertical for rinsing. Mechanism is provided for guiding the nozzle means between the first, and second, positions and means are also provided for positioning the container in relation to the nozzle means at its second position to accommodate piercing of the cover and fluid injection.

The dispensing apparatus, apart from the container, is of significance and comprises fluid injection means comprising nozzle means having tubular means for conveying a fluid, and piercing means connected to the nozzle means. Mechanism is included for guiding of the fluid injection means substantially vertically from a first position in which it is inclined to the vertical for rinsing of the nozzle means to a second position to dispense a fluid. There is also provided means for controlling the respective durations of rinsing and of fluid dispensing.

DESCRIPTION OF THE DRAWINGS

FIG. 4 is a rear elevational view of the present invention with the cover removed and showing the biasing means and locking means of the present invention;

FIG. 5 is a side elevational view of the present invention showing the injection nozzle in position for injecting a liquid into a container containing a food or beverage concentrate;

FIG. 6 is an enlarged view of the cup lid piercer and end of the liquid injection tube of the present invention;

FIG. 7 is a plan view taken along line 7—7 of FIG. 6; and

FIG. 8 is a plan view of the cup lid showing the slit formed therein by the slitter of the present invention.

DESCRIPTION OF THE PREFERRED EMBODIMENT

Figure 1:
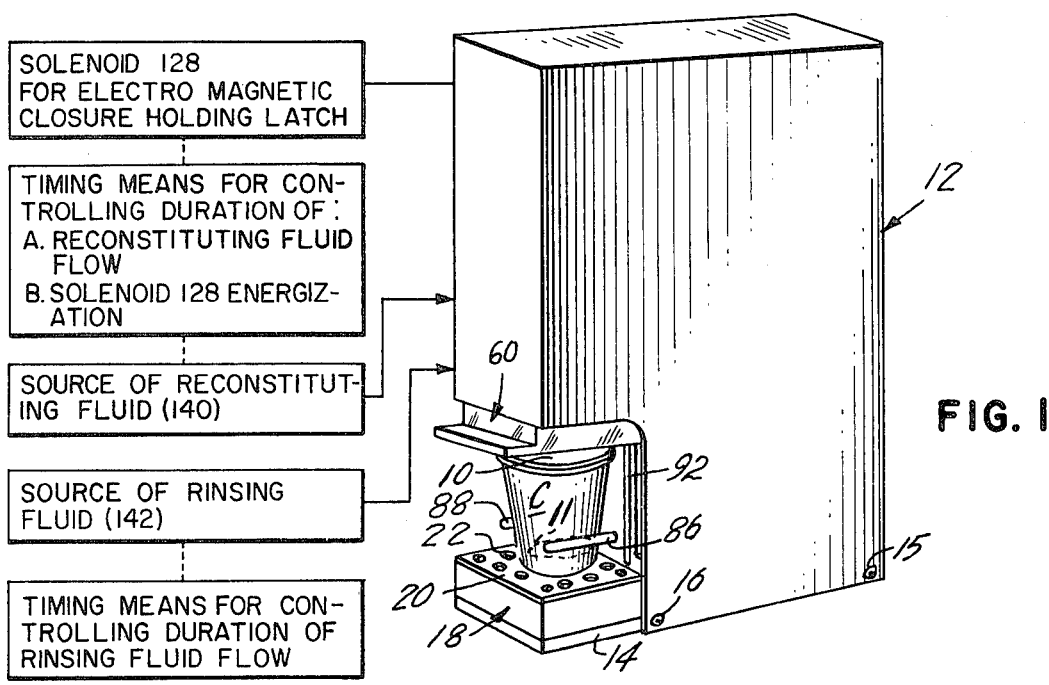
FIG. 1 is a perspective view of the system of the present invention showing a cup positioned for injection with liquid and wherein a cover is positioned about the apparatus.

FIG. 1 shows generally the overall apparatus of the present invention including a container or cup C, having a pierceable and peelable lid or cover 10 adhered over the open end of the cup C to close the open end, for receiving a predetermined amount of heated water to mix with and reconstitute a food, such as soup and including beverages and other consumables concentrate 11 disposed within the cup. As is seen a cover 12, enclosing the apparatus, is fastened to a base support 14 by means of screws 15 and 16, and by another pair of screws to the opposing side of the base support 14, not shown. A drain box 18, having a drain outlet, not shown, is positioned on the base support 14 and carries thereon a cup receiving top plate 20, having drainage perforations 22, which is suitably secured to the sides of the drain box.

Figure 3:
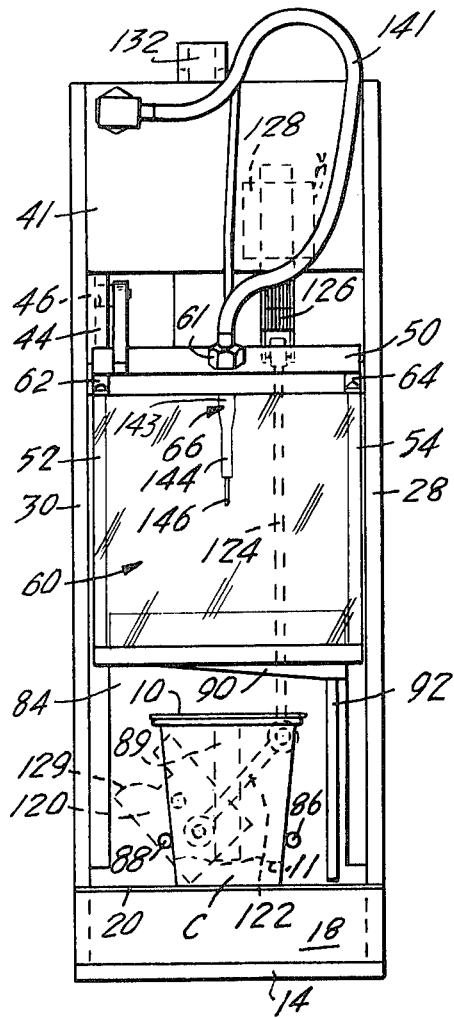
FIG. 3 is a front elevational view of the present invention with the cover removed showing the injection nozzle in the fully retracted rinsing position.
Figure 2:
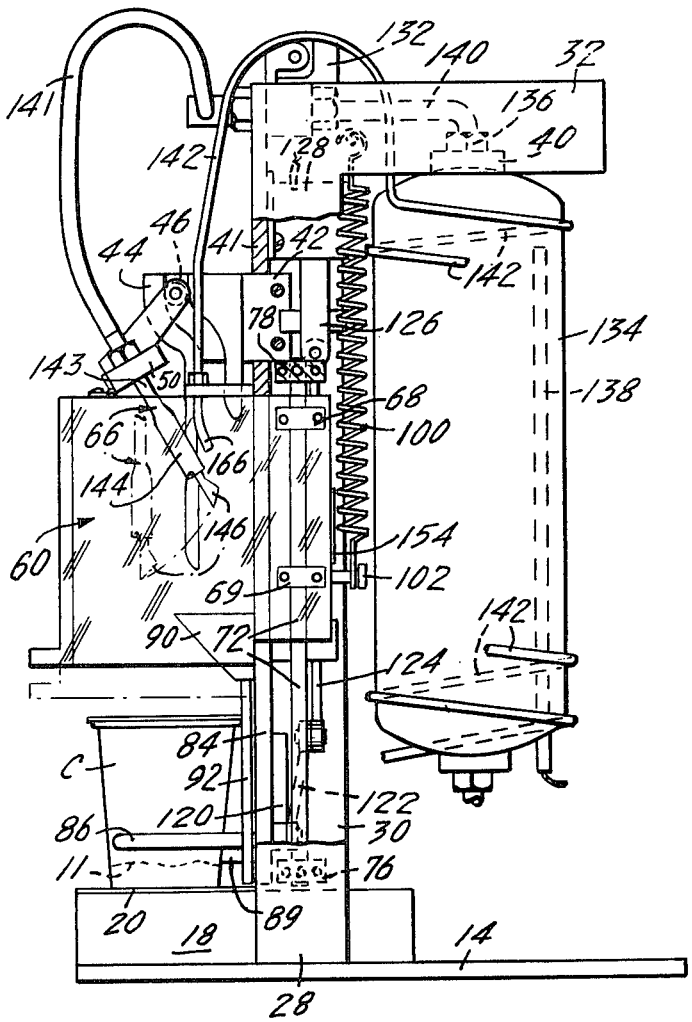
FIG. 2 is a side elevational view of the present invention with the cover removed showing the injection nozzle in the fully retracted rinsing position.

Referring now to FIGS. 2 and 3, vertical support members 28 and 30, to which are connected top support members 32 and 34 respectively, are provided and which are suitably connected to the base support 14. A horizontal support member 40 is likewise suitably fixed between the top support members 32 and 34, and a front support 41 is connected to the vertical support members, as shown. As also shown, a support bracket 42 is attached to the vertical support member 28 and to which is fixedly connected a cam 44. The cam 44 slideably receives a cam follower 46 which is connected with a cross member 50. The cross member 50 is in turn pivotably attached to the top of the side walls 52 and 54 of a three sided enclosure 60 by means of hinges 62 and 64, respectively. The enclosure 60 is open at the bottom and back for operation and is, preferably, of a clear plastic. As shown, a nozzle, designated generally by the arrow 66, is fixed through the cross member 50 secured thereto by means of a nut 61 threaded about the nozzle and tightened against the top surface of the cross member 50.

Attached to the rear of the side walls 52 and 54 of the enclosure 60 are collars 68 and 69, and 70 and 71, which slideably engage spaced apart guide rods 72 and 74, respectively, and shown in FIGS. 2, 4 and 5. The ends of the guide rod 72 are secured within a bore in a lower mounting block 76, and in a bore in an upper mounting block 78, which are in turn fixedly connected to the vertical support member 28. Likewise the ends of guide rod 74 are secured within a bore in a lower mounting block 80 and in a bore in an upper mounting block 82, which are fixedly connected to vertical support member 30. Referring particularly to FIGS. 2 and 3, a front support plate 84 is attached to the vertical support members 28 and 30, about which the enclosure 60 travels in a manner later discussed. The front support plate 84 carries thereon cup positioning rods 86 and 88, and a stop 89, as well as an inclined drain 90 which terminates in a drain tube 92.

Referring now particularly to FIG. 4 one end of a spring 100 is connected about a pin 102 connected to the lower mounting block 76 and the other end of the spring 100 is connected about a pin 104 connected with the top support 32. Likewise an end of a spring 106 is connected about a pin 108 secured to the lower collar 71 and the other end of the spring 106 is connected about a pin 110 which is connected to the top support 34. These springs 100 and 106 serve to provide means of raising the enclosure 60 and nozzle 66 following injecting of heated water into the cup C, as will later become more clear.

Reference is now made again to FIG. 2, and still to FIG. 4, which most clearly show the mechanism of securing the enclosure in the lowered position during injecting of heated water into the cup C. As shown, a latch 120 is pivotally attached to the front support plate 84. An end of a link 122 is pivotally connected to the latch 120 and the other end of the link is pivotally connected to an end of a vertically extending rod 124 which passes through a supporting block 125 secured to the back of the front support plate 84. Connected to the back of the front support member 41 is an electromagnet comprising an armature 126 connected with the other end of the rod 124 and a coil 128. The latch 120 includes a lip portion 129 FIG. 3 which, due to the positioning of the latch 120, is engaged by the lower collar 71 or enclosure 60 when it is lowered for injecting of heated water into the cup C, shown in FIG. 5. A piston rod 159, and piston 130, slidable by spring compression within a cylinder 132 fixed to front support 41, is connected with the lower collar 71 by means of a pin 131 so that when the enclosure is raised by the springs 100 and 106 and the piston assembly, a cushioning feature is provided.

Referring again to FIG. 2 a tank 134 for heated water is attached to the horizontal support member 40, by means of a nut 136, as shown. A heating rod 138 connected with a source of electrical current is disposed therein in a well known fashion for heating of the water and a pipe 140 communicates with the tank 134 and a tube 141 which in turn communicates with the nozzle 66 for supplying of heated water into the cup C. A second tube 142, connected with a source of water, FIG. 1, is coiled about the outside of the tank to convectionally heat the water and terminates at 166 in a position adjacent the nozzle 66 when the nozzle is in the rinsing position for rinsing thereof, as shown in FIG. 2.

Referring now to FIGS. 6 and 7, which show the detail of the nozzle 66, it is seen that the nozzle 66 includes a tube 143, communicating with tube 141, which has a flattened outlet portion 144. A substantially flat piercer or knife 146 is partially positioned and secured within the outlet portion 144 and extends beyond, or downstream from, the outlet portion 144. As seen, a water passage is formed between the inside wall of outlet portion 144 and the knife 146. The knife 146 includes a knife edge 150 which is inclined to the longitudinal axis of the bore of tube 143 and disposed downstream from outlet portion 144. The cooperative disposition and arrangement of the knife edge 150 and flattened portion 144 is such as to form a narrow and substantially straight slit 152 through a cup lid or cover 10, shown in FIG. 8. Thus when the knife 146 is withdrawn from the cup C after the injection of heated water therein the slit is sufficiently narrow to prevent significant spillage of the cup's contents should the cup be tilted or knocked over. The narrow slit also restricts heat loss and assists in steeping of the reconstituted product.

The operation of the hereinabove described apparatus embodying the present invention will now be described. An operator inserts a cup C having a food or beverage concentrate contained therein, sealed with a peelable lid 10, onto the top plate 20, between cup guides 86 and 88, and against stop 89. The operator then lowers the enclosure 60, and thereby the nozzle 66, against the tension of the springs 100 and 106 and the piston assembly 130, 132, 159. During the lowering operation the nozzle 66 is initially cammed from the retracted rinsing position shown in solid line to an intermediate position shown in phantom line in FIG. 2. The enclosure 60 is then further lowered to the full downward position, and thereby the nozzle to its extended position shown in FIG. 5. On arriving at such position the knife 146 slits cover 10 and the open end of the tube 141 projects slightly into the cup C. Also during lowering of the enclosure 60 the lower collar 71 engages the lip portion 129 of the latch 120 which causes the latch to pivot thereby moving the vertically extending rod 124 and armature 126 upwardly whereby te armature engages the coil 128. When in this position the coil 128 is automatically energized which magnetically attracts and holds the armature 126, thereby holding the enclosure 60 and nozzle 66 in a predetermined extended or downward position. The coil 128, when energized, also activates apparatus, FIG. 1 to inject heated water from the tank 134 into the cup C via pipe 140 and flexible tube 141, for a period of time sufficient to fill the cup, following which the current to the coil is shut off. The energization occurs as a result of a metal bar 154, connected to the edge of the side wall 54 and shown in FIG. 5, engaging a terminal block 156, shown in FIG. 4, to close a circuit, not shown, as the enclosure 60 is lowered. Since the enclosure 60 and nozzle 66 are now no longer held in the downward position, due to deenergization of coil 128, the biasing force of the tension of the piston assembly and springs 100 and 106 causes the enclosure 60 and nozzle 66 to return to the full upward, retracted position wherein the nozzle 66, including the knife 146, is cammed to the tilted position, as shown in solid line in FIG. 2. This provides for a safety feature when the apparatus is serviced or cleaned since the knife 146 is now not as exposed. At this point the metal bar 154 engages a terminal block 158, connected to the edge of the side wall 54 as also shown in FIG. 5, which closes a circuit, not shown, to activate apparatus, FIG. 1 to feed heated water through the tube 142, now adjacent the nozzle 66, to rinse the nozzle for a predetermined period of time sufficient to cleanse the same. The spent rinse water flows into the inclined drain 90 then down the drain tube 92 and into the drain box 18. At this time the cup is removed and the lid peeled therefrom for consumption of the contents. Following rinsing the nozzle 66, the apparatus is in standby position for receiving another cup containing a food or beverage concentrate for reconstitution.

It is understood that the foregoing general and detailed descriptions are explanatory of the present invention and are not to be interpreted as restrictive of the scope of the following claims.

What is claimed is:

1. A system for reconstituting food concentrates and the like comprising, a container having an open end and a food concentrate disposed therein, a pierceable and peelable cover adhered over said open end, means defining a source of reconstituting fluid, injection means comprising nozzle means in fluid flow communication with said source for discharging said fluid and piercing means connected therewith, said nozzle means and said piercing means operable for substantially vertical movement from a first, retracted position to a second, extended position to pierce said cover to form an opening therein and position said nozzle means to inject said fluid into said container through said opening to mix with and reconstitute said food concentrate, said nozzle means and said piercing means in said retracted position further being displaced laterally as respects the direction of vertical movement, mechanism for guiding said nozzle means and said piercing means between said retracted and said extended positions, means defining a source of rinsing fluid, means for directing rinsing fluid from said last recited source over said nozzle means and said piercing means upon movement thereof to said retracted position, means for positioning said container in relation to said nozzle means and said piercing means at said extended position to accommodate said piercing and said fluid injection, and means for controlling respective durations of the recited discharge of reconstituting fluid and direction of rinsing fluid in the corresponding extended and retracted positions of said injection means.

2. Apparatus in accordance with claim 1 wherein said mechanism for guiding includes means operable to pivot said nozzle means and said piercing means in provision of the recited lateral displacement in said first, retracted position.

3. Apparatus in accordance with claim 2 including spring means effective to move said nozzle means and said piercing means from said second, extended position to said first, retracted position.

4. Apparatus in accordance with claim 3 including closure means substantially enclosing said nozzle means and said piercing means and movable with the latter as they are moved between said first, retracted position and said second, extended position.

5. Apparatus in accordance with claim 4 wherein said nozzle means and said piercing means are pivotally connected to said closure means and including means for holding said closure means and said nozzle means and said piercing means in said second, extended position for a predetermined period of time to accommodate injection of fluid into said container.

6. Apparatus in accordance with claim 5 wherein said means for holding said closure means comprises electromagnetic means including energizing means therefor and timing means operatively connected with said energizing means.

7. Apparatus in accordance with claim 1 wherein said piercing means comprises a substantially flat knife having a cutting edge inclined with respect to the direction of movement of said nozzle means and said piercing means to extended position.

8. Apparatus in accordance with claim 7 wherein said knife cutting edge is inclined with respect to said lid when said knife is at said second, extended position.

9. Apparatus in accordance with claim 8 including means for supplying heated water to said nozzle means.

10. Apparatus for dispensing fluid, comprising: a first fluid source; fluid injection means comprising nozzle means leading from said first source for discharging said fluid, and piercing means connected thereto; mechanism operative to guide said nozzle means and said piercing means substantially vertically from a first, retracted position to a second extended position to dispense said fluid; a second fluid source; means leading from said second source operable automatically to direct fluid therefrom onto said nozzle means and said piercing means to rinse the same upon movement thereof to said first, retracted position; and means for controlling respective durations of fluid discharge and direction from said sources.

11. Apparatus in accordance with claim 10 including means to pivot said nozzle means and said piercing means as they are moved to said first, retracted position.

12. Apparatus in accordance with claim 11 including spring means to move said nozzle means and said piercing means from said second, extended position to said first, retracted position.

13. Apparatus in accordance with claim 12 including closure means substantially enclosing said nozzle means and said piercing means, and movable between said first, retracted position and said second, extended position with said nozzle means and said piercing means.

14. Apparatus in accordance with claim 13 wherein said means to pivot said nozzle means and said piercing means comprises pivotal connection thereof to said closure means and including means for holding said closure means and thereby said nozzle means and said piercing means in said second, extended position for injection of a fluid for a predetermined period of time, said means for holding said closure means comprising electromagnetic means, energizing means, and timing means operatively connecting said electromagnetic means with said energizing means.

15. Apparatus in accordance with claim 10 wherein said piercing means comprises a substantially flat knife having a cutting edge inclined with respect to said nozzle means.

16. Apparatus in accordance with claim 15 wherein said nozzle means is flattened and said substantially flat knife is so positioned as respects said nozzle means as to form a restrictive fluid flow path through said nozzle means.

17. Apparatus in accordance with claim 10 wherein said piercing means comprises a substantially flat knife including a mounting portion connected in said nozzle means to leave a flow passage and a cutting portion extending beyond said nozzle means said cutting portion including a knife edge inclined with respect to said nozzle means.

18. In apparatus for reconstituting foods, beverages, and the like of the type disposed in a container provided with a piercable cover portion, the combination comprising: means for supporting said container; a source of fluid; fluid discharge nozzle means leading from said source and including blade means cooperably disposed therewith to pierce a container cover portion and accommodate introduction of said fluid discharged from said nozzle means into said container; means for providing introduction of a predetermined quantity of said fluid into said container; means for moving said nozzle means between an extended, fluid discharge position and a retracted, stored position; a source of rinsing fluid means leading from said source of rinsing fluid and operative automatically to direct said rinsing fluid onto said nozzle means upon movement thereof to said retracted, stored position; and means for controlling respective durations of the recited discharge of fluid from said nozzle means and the recited directing of rinsing fluid onto said nozzle means.

19. The combination according to claim 18, characterized by the inclusion of means for holding said nozzle means in said extended position, and means operative automatically release said means for holding and to move said nozzle means to said retracted, stored position in response to introduction of said predetermined quantity of fluid.

* * * * *